2,746,770
Patented May 22, 1956

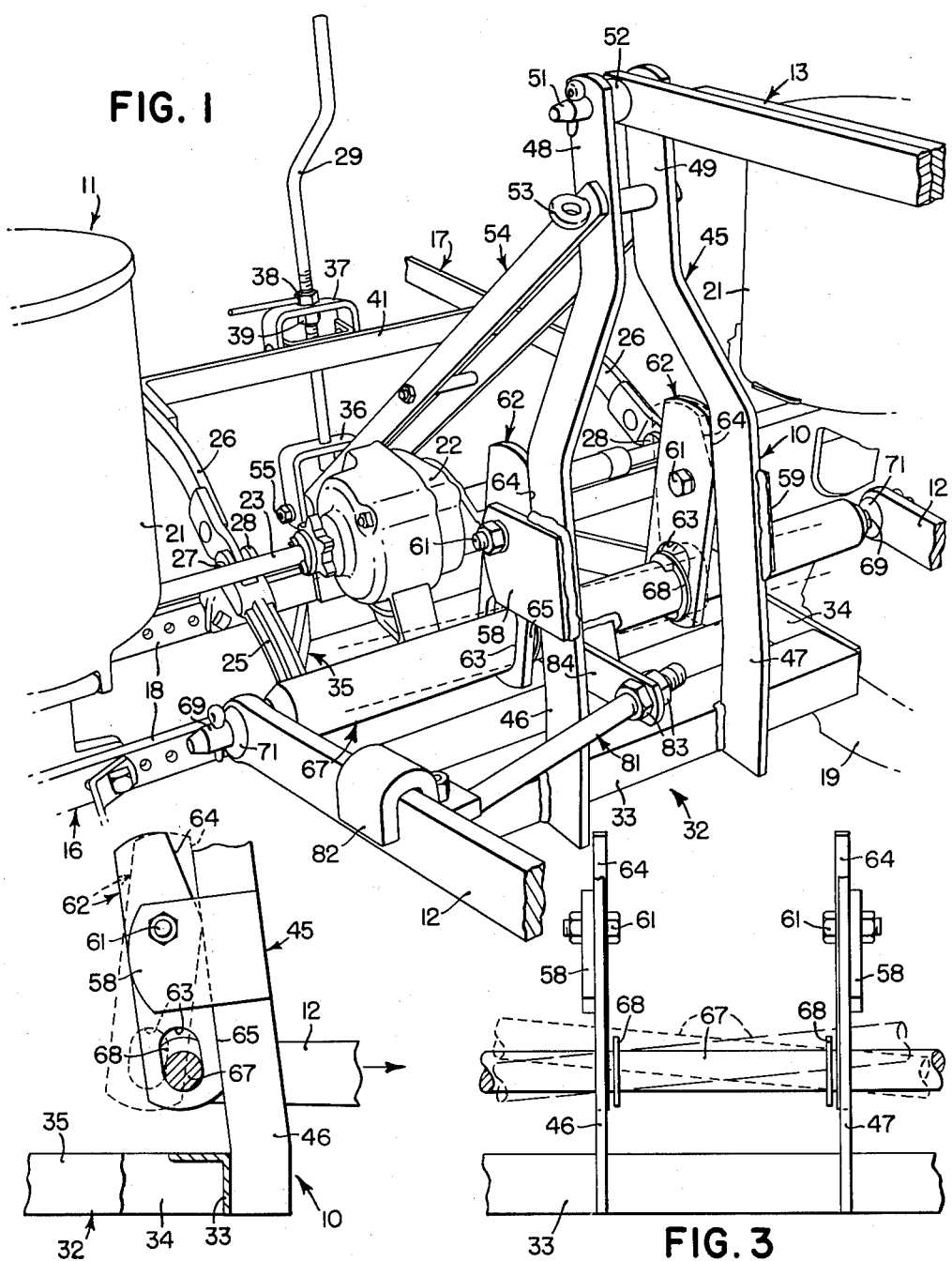

2,746,770

LATERALLY FLEXIBLE DRAFT MECHANISM

Knud B. Sorensen, Rock Island, and John O. Braet, Moline, Ill., assignors to Deere & Company, Moline, Ill., a corporation of Illinois Application November 3, 1952, Serial No. 318,464

12 Claims. (Cl. 280—446)

The present invention relates generally to agricultural implements and more particularly to a hitch device for connecting such ground-working implements as planters and the like with a tractor of the type having a three-point hitch linkage or other draft-transmitting attachment means.

The object and general nature of the present invention is the provision of a hitch device for connecting a planter or the like to a tractor in such a way that, while lateral swinging of the planter relative to the tractor is provided, there is no appreciable tendency for the planter to drift toward one side or the other and stay in that position. More specifically, it is a feature of this invention to provide a hitch device that accommodates both lateral tilting and lateral swinging of the planter relative to the tractor, thereby accommodating uneven ground, planting along contour lines, and the like without interfering with the trailing of the planter directly behind the tractor when traveling forwardly in a straight line. Further, it is a feature of this invention to provide a hitch device which, while permitting lateral swinging of the implement relative to the tractor, is so constructed and arranged that when lateral displacement does occur a substantial restoring force is immediately available for bringing the implement back to a center position.

These and other objects and advantages of the present invention will be apparent to those skilled in the art after a consideration of the following detailed description, taken in conjunction with the accompanying drawings, in which:

Figure 1 is a fragmentary perspective view of a hitch device particularly adapted for connecting an implement, such as a planter, to a tractor of the type having a pair of lower draft-transmitting links and an upper compression or thrust link, Figure 1 showing the hitch device in full lines in the position the parts occupy when the implement is raised.

Figure 2 is a fragmentary view, showing the position of the motion-limiting links in the positions they occupy when the planter or other implement is in operating position.

Figure 3 is a front view, looking rearwardly, of portions of the hitch device, showing the manner in which the latter accommodates lateral tilting of the implement relative to the draft linkage and associated parts of the tractor.

Referring first to Figure 1, the hitch device of the present invention is indicated in its entirety by the reference numeral 10 and is shown as connecting an implement 11, such as a two-row planter, to a tractor of the type having a pair of lower draft-transmitting links 12 and an upper thrust or compression link 13.

The planter 11, which represents any suitable type of farm implement, is per se of generally conventional construction, comprising a runner frame 16 and a wheel frame 17. The runner frame includes a pair of transversely extending, parallel sill bars 18 to which the furrow-opening runners 19, seed hoppers 21, gear case 22,
seeding shaft 23 and other parts are connected. Secured to the runner frame bars 18 is a pair of yoke members 25 to which the front ends of the right- and left-hand wheel frame bars 26 are pivotally connected, as by a pair of pivot pins 27, carried by bifurcated lug sections 28 on the yokes 25. The position of the runner frame 16 relative to the wheel frame 17 is controlled by a crank screw 29 to which reference will be made below.

Connected rigidly to the runner frame is a draft frame 32 that forms the lower portion of the hitch frame or hitch unit 10. The draft frame 32 includes a transverse member 33, preferably in the form of an angle, as best shown in Figure 2, to which the forward ends of a pair of rearwardly converging frame bars 34 and 35 are fixed. The rear portions of the frame bars 34 and 35 are brought close together and pivotally receive a yoke 36 to which the lower end of the crank screw 29 is swively connected. The upper end portion of the crank screw 29 is connected by a yoke 37 and a pair of screw-threaded members 38 and 39 carried by a crossbar 41 that forms a part of the wheel frame 17, whereby turning the crank screw 29 acts against the rear end of the draft frame section 32 and the wheel frame 17 to adjust one relative to the other about the transverse axis defined by the pivots 27.

The hitch frame unit 10 also includes a mast section 45 which preferably is in the form of a pair of vertically extending bars 46 and 47 secured, as by welding, to the front angle 33 of the draft frame section. The bars 46 and 47 are formed to converge at the upper ends, terminating in parallel sections 48 and 49 which are apertured at their upper ends to receive the pin 51 that passes through the ball connector 52 at the rear end of the upper thrust link 13. Below the pin 51 the bar sections 48 and 49 are apertured to receive a pin 53 that connects the upper forward end of a brace bar 54. The latter member extends downwardly and rearwardly from the upper portion of the mast section 45 and is connected in any suitable way to the rear end of the draft frame section, as by the cross pin or pivot member 55 that serves also to pivotally connect the yoke 36 to the rear end of the draft frame bars 34 and 35. Secured to the intermediate portions of the mast bars 46 and 47 and extending rearwardly therefrom is a pair of bracket plates 58 and 59 that are apertured to receive pivot bolts 61 by which a pair of drawbar arms or levers 62 are pivotally connected to the brackets 58 and 59.

The drawbar arms or levers 62 are of particular construction. As best shown in Figure 2, each of these members includes a lower end that is provided with a slot 63 that extends in a generally vertical direction and the upper end is provided with a forward edge section 64 that lies at an angle to the forward edge portion 65 at the lower end of the arm or lever 62. A transverse drawbar 67 is disposed in the slots 63 and is adapted to be loosely disposed therein, whereby the bar may be shifted bodily vertically or tilted in a generally vertical plane relative to the associated mast structure 45. The drawbar 67 is held against lateral or axial displacement with respect to the mast 45 by a pair of stop rings 68 that are welded or otherwise secured to the drawbar 67. The latter member is preferably in the form of a solid shaft or rod and has reduced ends 69 that are adapted to be received by the ball connections 71 at the rear ends of the tractor draft links 12. The drawbar 67 normally forms a part of the hitch frame unit 10, and where the draft links 12 are connected with the tractor for lateral swinging, as in the Ferguson system, means is provided for holding the draft links 12 against lateral swinging which, in one form of the invention, includes a member 81 having a hook section 82 at one end adapted to engage over the associated bar 12 and threaded at its other end to receive a pair of lock nuts 83 whereby the threaded end may be firmly fixed to a bracket 84 connected, as by welding, to the generally central portion of the drawbar 67.

By virtue of the drawbar arms or levers 62 and associated parts, when the implement 11 is connected to the tractor, the implement may swing laterally with respect to the tractor, whereby the outfit may be used for planting around contours and the like, by virtue of the fact that the arms or levers 62 have limited pivotal movement relative to the associated mast structure 45. This limited pivotal movement is indicated in dotted lines in Figures 1 and 2. Normally, in straight-ahead travel, the forward pull is transmitted from the draft links 12 through the drawbar 67 to the swingable arms or levers 62. The draft pull brings the forward edges 65 of the arms 62 up against the rear edges of the associated mast bars 46 and 47, whereby the forward pull is transmitted to the lower draft frame section 32 and thence to the implement 11. If, however, the implement tends to swing laterally relative to the tractor, it can do so by virtue of the fact that either of the arms 62 is capable of swinging rearwardly at its lower end through a limited extent until the upper edge 64 engages the rear edge of the associated mast bar, as indicated in dotted lines in Figure 1. However, as soon as the rear end of the arm or lever 62 leaves the associated mast bar, then all forward pull is transmitted through the other lever or link 62 by virtue of its contact at the lower edge 65 with the hitch frame mast. Since this point of pull is disposed at one side of the center of the implement, there is established thereby a restoring force which tends to swing the implement back to its center or straight-ahead position.

The implement 11 may also tip laterally, as about a generally fore-and-aft extending axis, by virtue of the fact that either end of the drawbar 67 may swing upwardly in the associated slot 63, as indicated in dotted lines, Figure 3. The connections between the ends of the brace bar 54 and the implement frame and mast structure are such that this relative movement is readily accommodated. When the draft links 12 and 13 are swung upwardly by the tractor power lift mechanism (not shown), the implement in its entirety is raised off the ground. In its raised or transport position, the implement is, in effect, suspended through the brace 54 and the engagement of the upper ends of the draft arms 62 with the mast bars 46 and 47, as shown in full lines in Figure 1. The connections between the front and rear ends of the brace bar 54 and the implement and mast structures are sufficiently loose to accommodate lateral swinging and lateral tilting of the implement relative to the mast structure as described above.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A hitch device for connecting an implement to a tractor of the type having a pair of laterally spaced apart draft elements, said hitch device comprising a generally vertically disposable mast structure, means rigidly connecting upper and lower portions of the mast structure to upper and lower portions of the implement, a pair of laterally spaced apart slotted members carried by said mast structure, and a crossbar disposed in said slotted portions and attachable at its ends to said draft elements, the slots in said members extending generally vertically a distance greater that the vertical dimension of said crossbar, whereby lateral oscillation of the implement and mast structure relative to the crossbar is limited to that permitted by movement of the crossbar within said slots relative to the mast structure.

2. A hitch device for connecting an implement to a tractor, comprising a generally vertically disposable mast structure adapted to be connected with the implement, a crossbar disposed transversely of said mast structure in a generally horizontal position and adapted to be connected at its ends with the tractor, a pair of levers pivotally connected in laterally spaced apart relation with said mast structure and swingable relative thereto in generally vertical fore-and-aft extending parallel planes about a generally transverse axis, each of said levers having limited pivotal movement relative to the mast structure, and means connecting one end of each of said levers with said crossbar.

3. The invention set forth in claim 2, further characterized by the lower end of said levers having slotted portions receiving said crossbar and accommodating a limited amount of vertical movement of the latter relative to said levers.

4. The invention set forth in claim 2 further characterized by said crossbar being loosely received by said levers, and means acting between the latter and said crossbar for limiting lateral displacement of the crossbar relative to said levers.

5. A hitch device for connecting an implement having a frame to a tractor of the type including a pair of laterally spaced apart, generally fore-and-aft extending draft elements, said hitch device comprising a generally vertically disposed member having laterally spaced apart, generally vetrically extending sections, a pair of parts, means movably connecting said parts, respectively, with said sections, said last mentioned connecting means including means limiting the relative movement of each of said parts relative to the associated section, a crossbar connected with said laterally spaced apart parts and extending laterally thereof, and means at the lateral outer ends of said crossbar to receive the rear ends of said draft elements.

6. A hitch device for connecting an implement having a frame to a tractor of the type including a pair of laterally spaced apart, generally fore-and-aft extending draft elements, said hitch device comprising a generally vertically disposed member having laterally spaced apart sections, a pair of parts, means movably connecting said parts, respectively, with said sections, said last mentioned connecting means including means limiting the relative movement of each of said parts relative to the associated sections, and a crossbar connected with said laterally spaced apart parts and adapted to be connected at its ends with said draft elements, said parts including vertically slotted portions receiving said crossbar, whereby the latter may move in a generally vertical direction relative to either or both of said parts.

7. A hitch device for connecting an implement having a frame to a tractor of the type including a pair of laterally spaced apart draft elements, said hitch device comprising a hitch frame means having sections spaced apart laterally a distance appreciably less than the lateral spacing between said draft elements, a pair of parts, means movably connecting said parts, respectively, with said sections, said last mentioned connecting means including means limiting the relative movement of each of said parts relative to the associated section, and a crossbar connected at points laterally inwardly of its ends with said laterally spaced apart parts and adapted to be connected at its ends with said draft elements.

8. A hitch device for connecting an implement to a tractor, comprising hitch frame means having laterally spaced apart sections, a pair of levers pivotally connected with said sections, respectively, each at an intermediate point, said levers being slotted at their end portions, a draft bar disposable loosely in the slotted portions of said levers, and means for limiting the lateral displacement of said draft bar relative to said levers.

9. A hitch device for connecting an implement to a tractor, comprising hitch frame means having laterally spaced apart sections, a pair of levers pivotally connected with said sections, respectively, each at an intermediate point, one end of each of said levers being slotted, a draft bar disposable loosely in the slotted portions of said levers, means at the other end of each of said levers for limiting pivotal movement thereof relative to said hitch frame sections, and means for limiting the lateral displacement of said draft bar relative to said levers.

10. A hitch device for connecting an implement having a frame to a tractor of the type including a pair of laterally spaced apart draft elements, said hitch device comprising a generally vertically disposed member having laterally spaced apart sections, a pair of parts, means connecting said parts, respectively, with said sections for generally fore-and-aft directed movement relative to said sections, and a crossbar connected with said laterally spaced apart parts and adapted to be connected at its ends with said draft elements, said parts including vertically slotted portions receiving said crossbar, whereby the latter may move in a generally vertical direction relative to either or both of said parts.

11. The invention set forth in claim 10, further characterized by means connected with said crossbar for and engageable with at least one of said slotted portions for limiting the lateral displacement of said crossbar relative to the slotted portions.

12. The invention set forth in claim 10, further characterized by a pair of stops fixed to the crossbar and engageable respectively with said parts for limiting the lateral displacement of said crossbar relative to the slotted portions.

References Cited in the file of this patent

UNITED STATES PATENTS

| 2,320,141 | Kott | May 25, 1943 |
| 2,341,807 | Olmstead et al. | Feb. 15, 1944 |

FOREIGN PATENTS

| 649,197 | Great Britain | Jan. 24, 1951 |